United States Patent
Krasner

(10) Patent No.: US 6,799,050 B1
(45) Date of Patent: Sep. 28, 2004

(54) REDUCING CROSS-INTERFERENCE IN A COMBINED GPS RECEIVER AND COMMUNICATION SYSTEM

(75) Inventor: Norman F. Krasner, San Carlos, CA (US)

(73) Assignee: Snaptrack, Inc., San Diego, CA (US)

( * ) Notice: Subject to any disclaimer, the term of this patent is extended or adjusted under 35 U.S.C. 154(b) by 557 days.

(21) Appl. No.: 09/874,747

(22) Filed: Jun. 4, 2001

(51) Int. Cl.[7] ............................................. H04Q 7/20
(52) U.S. Cl. ........................... 455/456.1; 455/456.6; 455/552.1; 455/550.1; 455/296; 342/357.06; 342/357.1; 342/357.12
(58) Field of Search ..................... 455/456.1, 456.6, 455/63.1, 552.1, 553.1, 550.1, 296; 342/357.06, 357.1, 357.12

(56) References Cited

U.S. PATENT DOCUMENTS

| | | | |
|---|---|---|---|
| 5,301,368 A | | 4/1994 | Hirata |
| 5,786,789 A | * | 7/1998 | Janky ................... 342/357.1 |
| 5,825,372 A | * | 10/1998 | Artieri ................... 345/566 |
| 6,107,960 A | * | 8/2000 | Krasner ................. 342/357.09 |
| 2002/0193108 A1 | * | 12/2002 | Robinett ................ 455/427 |
| 2003/0045333 A1 | * | 3/2003 | Kimata et al. ........... 455/574 |

FOREIGN PATENT DOCUMENTS

| EP | 1122554 A1 | * 8/2001 | ............. G01S/5/14 |
|---|---|---|---|
| WO | WO 01/06669 A1 | 1/2001 | |

OTHER PUBLICATIONS

PCT International Search Report for PCT Int'l Appln No. US02/20302, mailed Apr. 10, 2003, (7 pages).

* cited by examiner

*Primary Examiner*—Lee Nguyen
*Assistant Examiner*—Minh D. Dao
(74) *Attorney, Agent, or Firm*—Philip Wadsworth; Charles D. Brown; Donald Kordich

(57) ABSTRACT

A method of operating a mobile device is disclosed. A first activity of the mobile device is detected. The following two operations are executed upon detection of the first activity: (i) wireless transmission of data over a wireless data link from a communication unit of the mobile device is disabled for a period of time, and (ii) a first control signal is transmitted from a communication unit to a satellite positioning system receiver of the mobile device, the first control signal enabling processing of signal positioning system signals received by the receiver during this period of time. The size of this period of time may be predetermined or adaptable.

18 Claims, 6 Drawing Sheets

REDUCING CROSS-INTERFERENCE IN A COMBINED GPS RECEIVER AND COMMUNICATION SYSTEM

FIELD OF THE INVENTION

The present invention relates generally to the field of satellite positioning system (SPS) receivers, and more particularly to reducing cross-interference in a combined SPS receiver and communication system.

BACKGROUND OF THE INVENTION

The use of portable personal communication devices, such as cellular phones and pagers, has increased dramatically in recent years. Additionally, the use of portable navigational devices, such as Satellite Positioning System (SPS) receivers, has increased as these devices have become more widely available. Recent technological developments have allowed the combination of SPS receivers and communication systems in integrated units, such as a combination SPS receiver and cellular phone unit. Such combined devices have many applications such as personal security, emergency response, vehicle tracking, and inventory control. Some combination units combine separate SPS receivers and communication systems using suitable electronic interfaces. Others use shared circuitry and packaging. These combined units feature the convenience advantages afforded by common housings and integrated user interfaces. However, such combined units may also exhibit certain shortcomings, such as increased power consumption and reduced performance.

One marked disadvantage inherent in many combined SPS and communication devices is the decreased performance of the SPS receiver section of the combined unit. A common cause for this decreased performance is signal interference between the communication and SPS receiver stages. For example, in a combination cellular phone/SPS receiver, a cellular transmissions from the cellular telephone stage generate strong interference which can reduce the performance of the SPS receiver.

Current approaches to overcoming the cross-interference between the communication and SPS stages involve the use of complicated filters or high dynamic range circuits in the front-end section of the SPS receiver to limit the in-band interference to acceptable ranges. These approaches, however, require the use of complex additional circuitry which can increase the cost and power consumption of the combined unit. For example, one method of reducing the cross-coupling in a combination cell phone/SPS receiver is to use several bandpass filters in the RF front end of the SPS transmitter to eliminate the radio frequency (RF) interference from the cellular transmitter. However, there are several problems with this approach. First, several filters may be required to provide adequate reduction of the signal energy coupled into the SPS receiver RF circuitry from the cellular transmitter. This may increase cost and size of the combined unit. Secondly, the use of filters increases the noise figure of the SPS receiver, making it less sensitive to the satellite navigational signals.

It is therefore desirable to provide a system that reduces the cross-interference between the SPS and communication sections of a combined SPS/communication receiver.

It is further desirable to provide a system that improves the SPS reception performance in a combined SPS/communication receiver without adversely impacting the cost and sensitivity characteristics of the SPS receiver.

SUMMARY OF THE INVENTION

A method of operating a mobile device is disclosed. A first activity of the mobile device is detected. The following two operations are executed upon detection of the first activity: (i) wireless transmission of data over a wireless data link from a communication unit of the mobile device is disabled for a period of time, and (ii) a first control signal is transmitted from the communication unit to a satellite positioning system receiver of the mobile device, the first control signal enabling processing of signal positioning system signals received by the receiver during this period of time.

The first activity may for example be due to an operation carried out by a user of the mobile device, such as the depression of a button on the mobile device or the absence of speech received by a microphone of the communication unit.

Wireless transmission may be disabled and enabled in an alternating manner.

Other features of the present invention will be apparent from the accompanying drawings and from the detailed description which follows.

BRIEF DESCRIPTION OF THE DRAWINGS

The present invention is illustrated by way of example and not by way of limitation in the figures of the accompanying drawings in which references indicate similar elements and in which.

DETAILED DESCRIPTION

A method and apparatus for reducing cross-interference in mobile device which is a combination of Satellite Positioning System (SPS) receiver and communication device is described. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form to facilitate explanation.

In the following discussion, embodiments of the present invention will be described with reference to application in the United States Global Positioning Satellite (GPS) system. It should be evident, however, that these methods are equally applicable to similar satellite positioning systems, such as the Russian Glonass system. Thus, the term "GPS" used herein includes such alternative satellite positioning systems, including the Russian Glonass system. Likewise, the term "GPS signals" includes signals from alternative satellite positioning systems.

Mobile device

Figure 1:
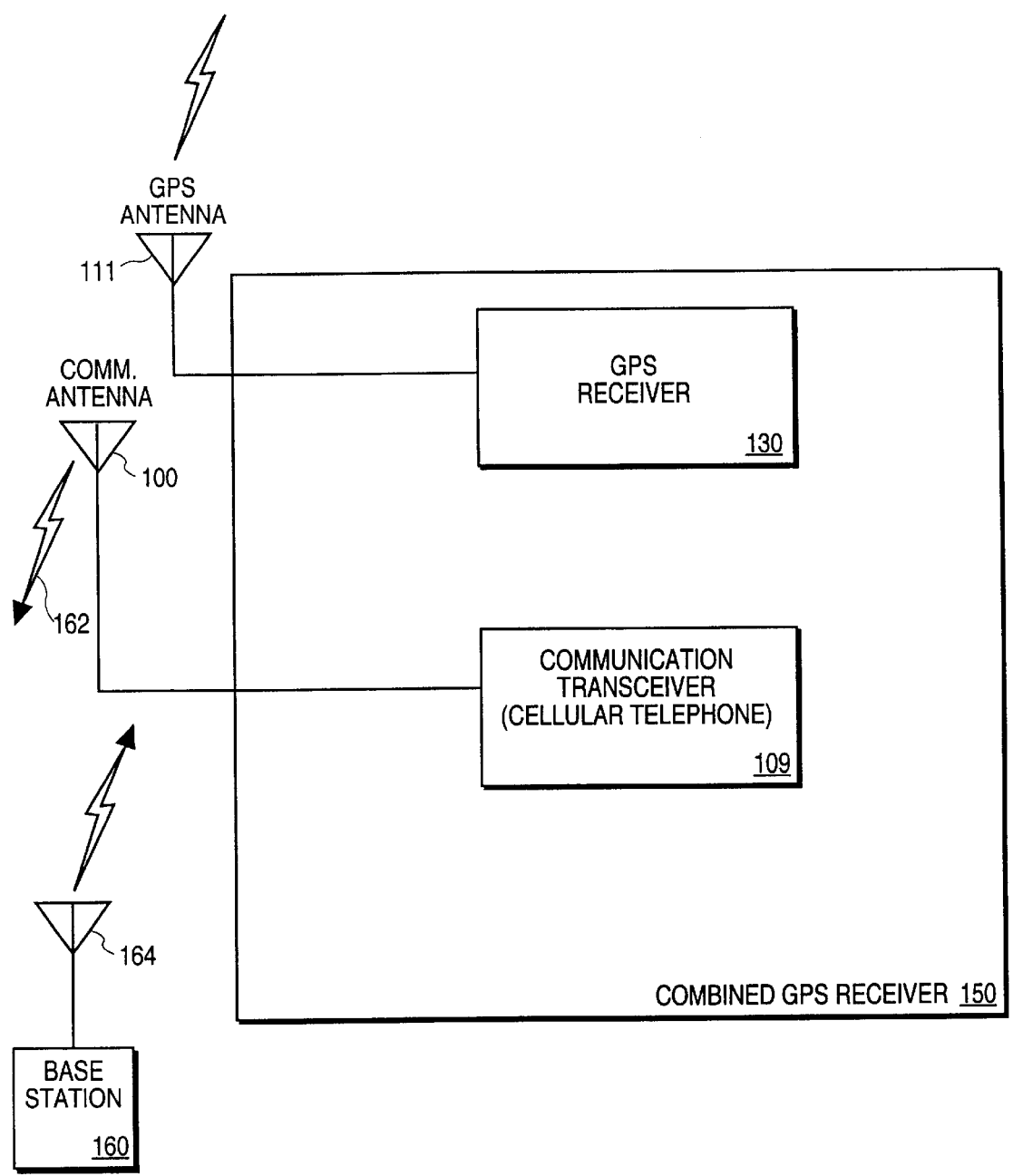
FIG. 1 is a block diagram of a combined Global Positioning System (GPS) receiver and communication system with a communication link to a basestation according to one embodiment of the present invention.

FIG. 1 is a block diagram of mobile device 150 which combines a communication transmitter/receiver (transceiver) with a GPS receiver for use in one embodiment of the present invention. The mobile device 150 is a portable hand-held unit that includes circuitry for performing the functions required for processing GPS signals as well as the functions required for processing communication signals transmitted and received through a communication link. The communication link, such as communication link 162, is typically a radio frequency communication link to another communication component, such as a basestation 160 having a communication antenna 164.

The mobile device 150 contains a GPS receiver 130 including an acquisition circuit and a processing section. In accordance with traditional GPS methods, GPS receiver 130 receives GPS signals transmitted from orbiting GPS satellites and determines the times-of-arrival (so-called "pseudoranges") of unique pseudo-random noise (PN) codes by comparing the time shifts between the received PN code signal sequences and internally generated PN signal sequences. GPS signals are received through GPS antenna 111 and input to an acquisition circuit which acquires the PN codes for the various received satellites. The navigational data (e.g., pseudoranges) produced by the acquisition circuit are processed by a processor for transmission by communication transceiver 109.

The mobile device 150 also includes communication transceiver section 109. Communication transceiver 109 is coupled to communication antenna 100. Communication transceiver 109 transmits navigational data processed by GPS receiver 130 through communication signals (typically RF) to a remote basestation, such as basestation 160. The navigational data may be the actual latitude, longitude, and altitude of the GPS receiver, or it may be raw or partially processed data. Received communication signals are input to communication transceiver 109 and passed to a processor for processing and possible output through an audio speaker.

According to one embodiment of the present invention, in the mobile device 150, pseudorange data generated by GPS receiver 130 is transmitted over communication link 162 to basestation 160. Basestation 160 then determines the location of combined receiver 150 based on the pseudorange data from the combined receiver, the time at which the pseudoranges were measured, and ephemeris data received from its own GPS receiver or other sources of such data. The location data can then be transmitted back to mobile device 150 or to other remote locations. The communication link 162 between mobile device 150 and basestation 160 may be implemented in a number of various embodiments including a direct link or cellular telephone link. In one embodiment of the present invention, the communication transceiver section 109 is implemented as a cellular telephone.

Figure 2:
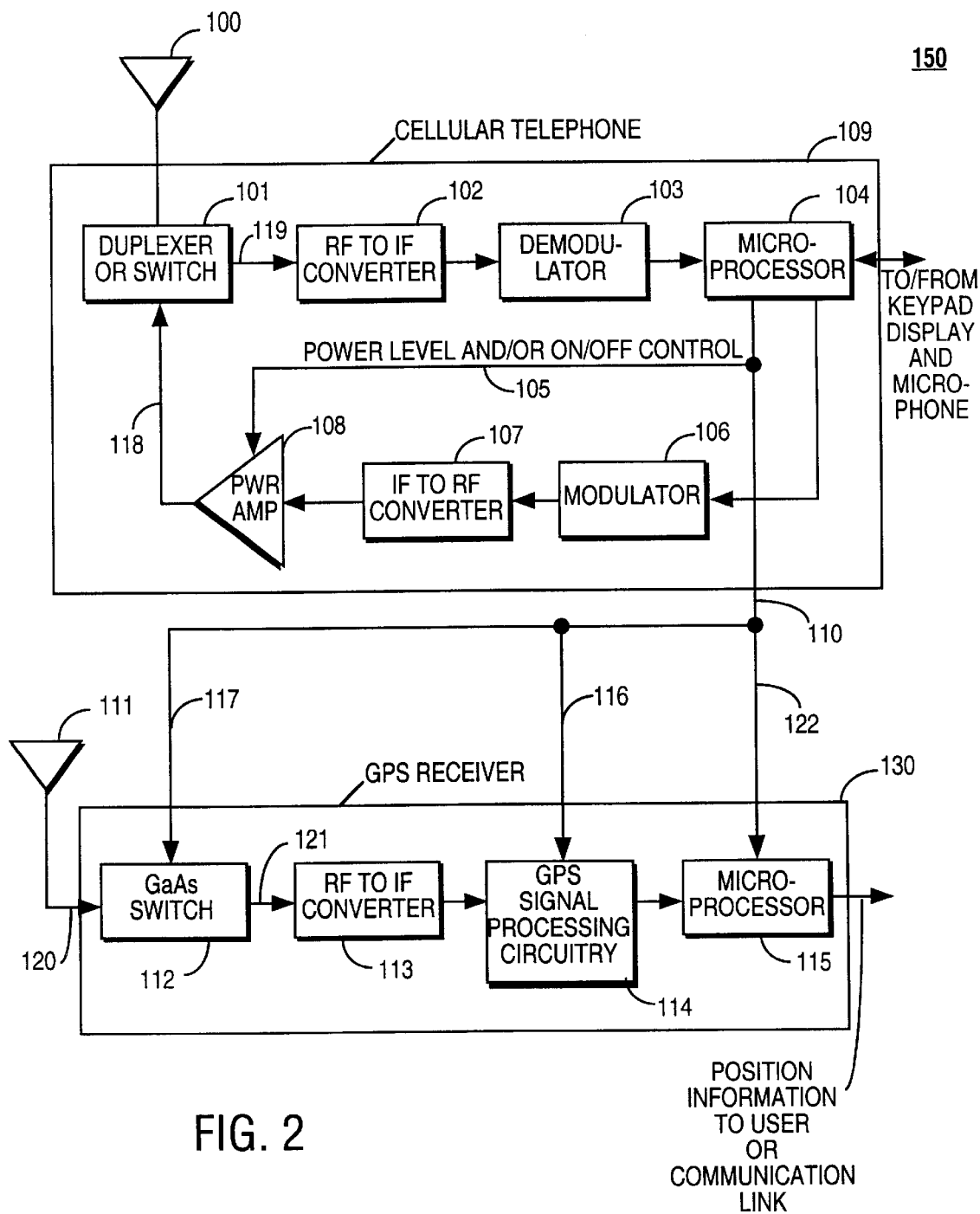
FIG. 2 is a block diagram of the components comprising the GPS receiver and communication transceiver in a mobile device according to an embodiment of the present invention.

FIG. 2 provides a more detailed block diagram of a combined cellular telephone and GPS receiver according to one embodiment of the present invention. It will be appreciated by those of ordinary skill in the art that the system illustrated in FIG. 2 is one embodiment, and that many variations in the design and construction of a combined GPS receiver in accordance with the teaching of the present invention are possible. For example, although the following discussion will assume that the communication section is embodied in a cellular telephone, it will be appreciated that the present invention may be embodied in other communication devices, such as two-way pagers, and similar bi-directional communicators.

In FIG. 2, the mobile device 150 comprises GPS receiver 130 and GPS antenna 111 (together referred to as the "GPS section"), and cellular telephone 109 and cell phone antenna 100 (together referred to as the "communication section"). The cellular telephone transmits and receives signals via antenna 100 to and from a remote base station (e.g., base station 160 in FIG. 1).

GPS Section

In the GPS receiver 130 of the mobile device 150, a received GPS signal is input from GPS antenna 111 through signal line 120 and switch 112 to a radio frequency (RF) to intermediate frequency (IF) converter 113. Frequency converter 113 translates the signal to a suitable intermediate frequency, for example 70 MHz. It then provides a further translation to a lower intermediate frequency, for example 1 MHz. The output of the RF to IF converter 113 is coupled to the input of GPS signal processing circuit 114. GPS signal processing circuitry 114 includes an analog to digital (A/D) converter which digitizes the output signals from the RF to IF converter 113.

In one embodiment of the present invention, GPS signal processing circuit 114 also includes a digital snapshot memory which is coupled to the output of the A/D converter and which can store a record of the data to be processed. The snapshot memory is used to process the GPS signals which are typically stored in a separate memory device coupled to GPS processing circuitry 114. The snapshot memory can also be employed for communication signals that are packetized, that is, signals consisting of bursts of data bits followed by long periods of inactivity. Continuous signaling, such as many cellular-type signals, may also be processed in a continuous manner by the processing circuitry.

The output from GPS signal processing circuitry 114 is coupled to microprocessor 115. Microprocessor 115 further processes the satellite signals received in GPS receiver 130 and outputs the processed signals for transmission directly to a user interface or through a communication link to a remote receiver (not shown).

In one embodiment of the present invention, the GPS receiver 130 is a conventional GPS receiver that uses a set of correlators to demodulate the GPS signals. In a method of the present invention, a gating signal either activates or deactivates the GPS receiver. When actuated, a conventional GPS receiver can perform all of its normal functions, including demodulation of the 50 baud satellite data message. However, if the gating periods become a large fraction of the data baud period, then demodulation may be difficult or impossible. In this case, an alternative type of GPS receiver may be used. For example, one type of GPS receiver only finds the relative times of arrival of the multiple simultaneously received GPS signals, and transmits these relative times of arrival (so-called "pseudoranges") to a remote location (see, for example, F. H. Raab, et al., "An Application of the Global Positioning System to Search and Rescue and Remote Tracking", Journal of the Institute of Navigation, Vol. 24, No. 3, Fall 1977, pp. 216–227). The position of the mobile device is then determined by combining this pseudorange data with the GPS satellite information which it gathers using its own receivers or via some other source of such data. This configuration is especially useful in various emergency response and tracking applications.

Although embodiments of the present application are discussed with regard to a particular GPS receiver configuration, it will be apparent to those of ordinary skill in the art, that several different GPS receiver configurations exist which may take advantage of the cross-interference reduction methods of the present invention.

Furthermore, although embodiments of the present invention are described with reference to GPS satellites, it will be appreciated that the teachings are equally applicable to positioning systems which utilize pseudolites or a combination of satellites and pseudolites. Pseudolites are ground based transmitters which broadcast a PN code (similar to a GPS signal) modulated on an L-band (or other frequency) carrier signal, generally synchronized with GPS time. Each transmitter may be assigned a unique PN code so as to permit identification by a remote receiver. Pseudolites are useful in situations where GPS signals from an orbiting satellite might by unavailable, such as tunnels, mines, buildings or other enclosed areas. The term "satellite", as used herein, is intended to include pseudolites or equivalents of pseudolites, and the term GPS signals, as used herein, is intended to include GPS-like signals from pseudolites or equivalents of pseudolites.

Communication Section

The communication section of the mobile device 150 includes a receiver stage and a transmitter stage coupled to communication antenna 100 through a duplexer or transmit/receive switch 101. When a communication signal, such as a cellular telephone signal, is received from a communication basestation (e.g., basestation 160), switch 101 routes the input signal to RF to IF converter 102. The RF to IF frequency converter 102-translates the communication signal to a suitable intermediate frequency for further processing. The output of the RF to IF converter 102 is coupled to demodulator 103 which demodulates the communication signal in order to determine the commands in the communication signal or other data in the communication signal (e.g., digitized voice, Doppler data or data representative of ephemeris of satellites in view). Demodulator 103 may be implemented as a digital demodulator. In this case, prior to input to demodulator 103, the frequency converted communication signal may be passed through an analog to digital (A/D) converter which digitizes the output signals from the RF to IF converter 102.

In one embodiment of the present invention, output from demodulator 103 is passed to microprocessor 104. Microprocessor 104 performs any processing required for the communication receive and transmit functions.

The microprocessor 104 is also connected to a display and to a microphone. The microphone has the ability to convert speech to voice data and provide the voice data to the microprocessor 104. When a transmission is required through the communication link, microprocessor 104 generates the data to be transmitted and baseband digital samples of the signal (or a representation thereof, such as a mathematical model of the signal). It then uses this data to modulate a carrier signal using modulator 106. Although analog modulation (such as frequency modulation) may also be used, in the latest systems, modulation is generally of a digital type, such as frequency shift keying or phase shift keying. In this case, the digital signal is converted from digital to analog in a D/A converter after modulation. The carrier frequency at which the modulation is performed in modulator 106 may or may not be at the final RF frequency of the communication signal; if it is at an intermediate frequency (IF), then an additional IF to RF converter 107 is used to translate the signal to a final RF frequency for the communication signal. A power amplifier 108 boosts the signal level of the communication signal, and this boosted signal is then transmitted to the communication antenna 100 through switch 101.

In a method of the present invention, a communication signal containing data representative of position information (e.g., pseudoranges to various satellites, or a latitude and longitude of the mobile device 150) is transmitted to basestation 160, through communication link 162. Basestation 160 may serve as a processing site for computing the position information of the portable GPS unit, or it may serve as a relay site and re-transmit the information received from the mobile device 150.

In some cellular telephone systems, such as Time-Division Multiple Access (TDMA) systems (including, for example, GSM, the Global System for Mobile Communications), the transmission and reception times of the cellular signals are disjoint. In those cases, a simple switch 101 may be used to isolate the strong transmitted signal 118 provided by power amplifier 108 from the path 119 connected to the sensitive front-end receiving circuitry (frequency converter 102). In particular, the receiving circuitry 102 may contain a low noise amplifier (LNA) which may be destroyed or otherwise adversely affected if the signal from the power amplifier is transmitted to the LNA without significant attenuation.

In other cellular systems, such as IS-95 North American based on Code Division Multiple Access (CDMA), there may be simultaneous transmission and reception of signals through the antenna 100. In order to isolate the RF circuitry of 102 from the high powered signal of 118 a device termed a "duplexer" is used instead of switch 101. Duplexer 101 consists of two RF filters, one tuned to the transmission band of frequencies and the other to the received band. The power amplifier output 118 is passed through the transmission filter and then to antenna 100, while the received signal from the antenna is passed through the receive filter. Thus, the transmissions are isolated from the RF circuitry 102 by an amount equal to the isolation that the receive filter provides at the transmission frequency.

Signal Gating of Communication Transceiver

In one embodiment of the present invention, mobile device 150 includes control circuitry which reduces cross interference between the GPS receiver and cellular transceiver stages. In combined receivers, cross-interference is often an especially acute problem since satellite signals received in the GPS receiver are typically very weak. Cross-interference typically occurs due to a high degree of coupling between the transmitted cellular telephone signal through antenna 100 and the GPS receiving antenna 111. This is especially true in the case where the antenna units 100 and 111 are collocated or share portions of their mechanical assembly in order to conserve physical space or reduce cost.

In one embodiment of the present invention, cross-interference between the communication and GPS sections of the combined unit is reduced by lowering the power to the transmitter of the communication section (typically a cellular telephone). Power of the transmitter is reduced for a period of time during which satellite positioning system signals may be processed, after which the transmitter is again powered up. A gating signal synchronizes the power control and GPS receiver operation. Reference is made to combined receiver of FIG. 2 for a description of the operation of a gating signal according to one embodiment of the present invention.

In the cellular telephone section 109 of the mobile device 150, a power level control signal 105 is transmitted from microprocessor 104 to power amplifier 108. In one embodiment of the present invention, a first state of the power level control signal reduces power in the power amplifier, and a second state of the signal restores normal power levels in the power amplifier. Alternatively, two signals are embodied within the power level control signal. A first signal reduces power in the power amplifier, and a second signal restores normal power levels in the power amplifier. Depending on the power level of amplifier 108 and the desired reduction in cross-interference, the power level control signal 105 can turn off power amplifier 108 completely, or reduce its amplification power by a predetermined amount.

The power level control signal 105 is also transmitted to the GPS receiver 130. This signal is programmed to activate the GPS receiver to receive and process GPS signals in relation to the power level of the communication power amplifier 108. When the power level control signal 105 reduces or cuts power to power amplifier 108, the GPS receiver 130 is activated to receive GPS signals. Conversely, when the power level control signal maintains normal power levels in power amplifier 108, the GPS receiver 130 is prevented from receiving GPS signals. Alternatively, the GPS receiver 130 may be programmed receive GPS signals but ignore such signals in its processing circuitry when the power level control signal indicates that the cellular telephone transmitter is at high power.

In GPS receiver 130, gating signal 110, corresponds to power level control signal 105. In one embodiment of the present invention, gating signal 110 is transmitted to microprocessor 115 through line 122, and to GPS processing circuit 114 through line 116, and to switch 112 through line 117. In one embodiment, switch 112 is controlled by gating signal 110 and power level control signal 105. When the power level control signal 105 reduces power to the cellular telephone power amplifier 108, switch 112 is turned on to allow data to pass from GPS antenna 111 to the GPS receiver circuits. Conversely, when the power level control 105 signal maintains high power to the power amplifier 108, switch 112 is turned to off so that no data is passed through to the GPS receiver. Thus, GPS signals are gated out (or blocked) during cellular telephone transmissions at high power, while they may be received at all other times.

In one embodiment of the present invention, switch 112 is a Gallium Arsenide (GaAs) switch. Because switch 112 is in the GPS input signal path, it will cause some attenuation of the input GPS signal. Use of a GaAs switch minimizes this attenuation. Moreover, current switch devices at the GPS frequency (1575.42 MHz) provide an insertion loss of about 0.5 dB.

In an alternative embodiment of the present invention, gating signal 110 may be input only to the microprocessor 115 instead of switch 117. In this configuration, microprocessor 115 directly controls switch 117 or GPS signal processing circuit 114 to gate the incoming GPS signals when the cellular telephone 109 is transmitting.

In a further alternative embodiment of the present invention, the GPS receiver 130 may not include GaAs switch 112. This switch may be omitted if the RF front end circuitry of the GPS receiver 113 can withstand the high power from the cellular telephone transmitter (e.g., with some type of limiting circuitry). Omission of switch 112 eliminates any potential signal attenuation through the switch. In this alternative embodiment, gating signal 110 is input to either or both GPS signal processing circuit 114 and microprocessor 115. This signal causes the input GPS signals to be disregarded by the processing circuitry during periods in which the cellular telephone is transmitting, even though these signals are received by GPS receiver 130.

Most modern digital cellular telephone systems have the ability to transmit at full power only a fraction of the time. Thus, the gating signal method described herein is applicable to a wide variety of digital cellular telephones. If cellular transmissions in these phones occur with a ⅛ duty cycle (as is the case of GSM digital cellular, or CDMA in reduced data throughput mode), then the loss in sensitivity of the GPS receiver due to such gating is only approximately 0.5 dB.

Figure 4:
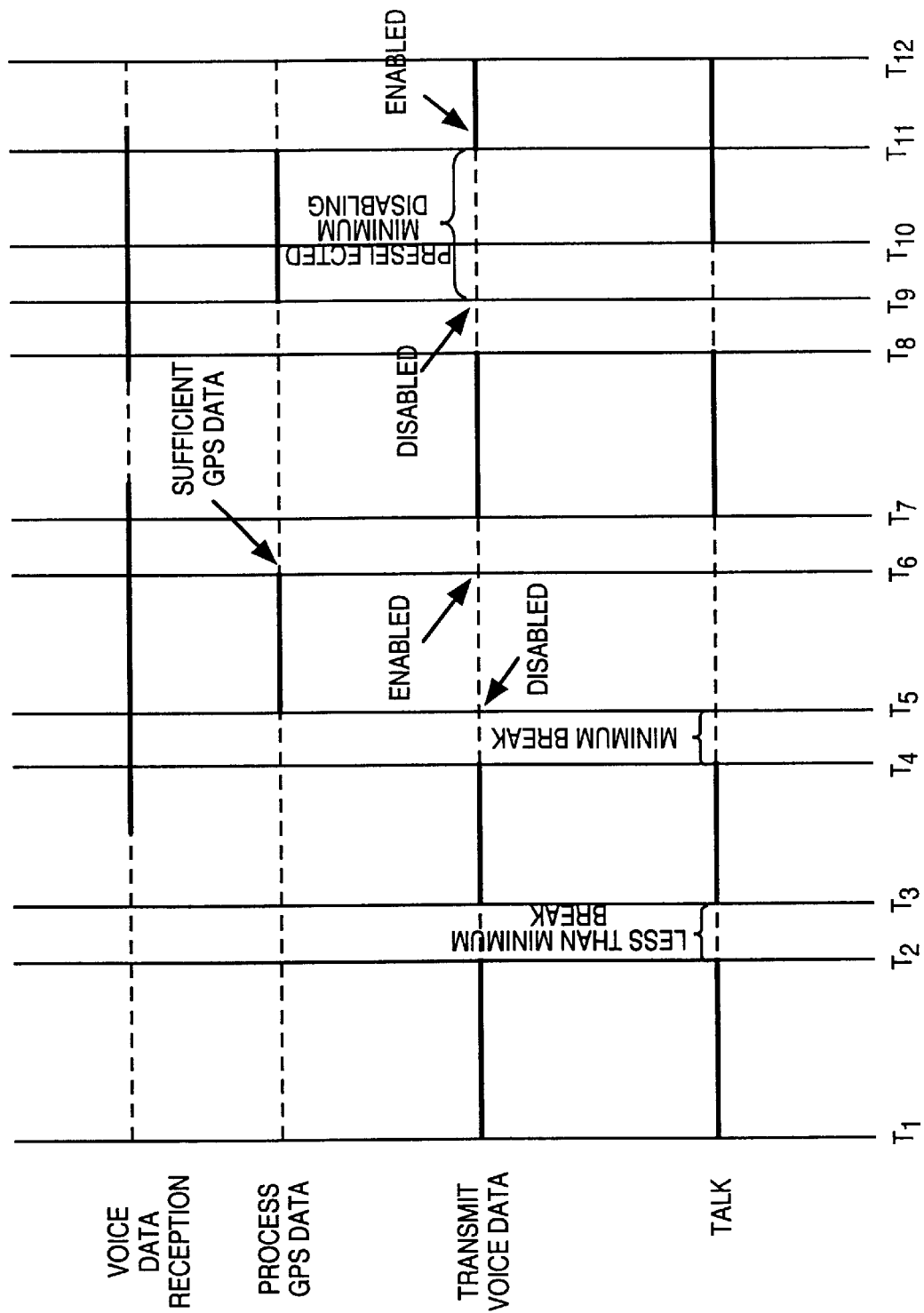
FIG. 4 is a time chart illustrating one method of operating a mobile device, according to the invention.

FIG. 4 illustrates one example of how the mobile device may operate. FIG. 4 is a time chart with times T1, T2, T3 etc. on the abscissa and actions such as "talk", "transmit voice data", and "process GPS data" on the ordinate.

Beginning at time T1, a person may talk into a microphone until time T2 is reached. Voice data is continuously transmitted from the mobile device during this time.

There may then be a break in speech from time T2 to time T3, after which speech is again resumed. Because the break from T2 to T3 is less than a predetermined minimum of, for example one-half second, voice data transmission is not interrupted.

There may then again be a break (that is, a pause) in speech at time T4. The break in speech may last until time T7. Because the break or pause in speech is more than a minimum break of one-half seconds, voice data transmission is disabled after the minimum break at time T5. A control signal is transmitted at time T5 which enables GPS data processing. GPS data processing is continued until time T6. A difference between time T6 and time T5 is sufficiently large to enable processing of a required minimum amount of GPS data, typically one to two seconds. The minimum amount of GPS data is sufficient to triangulate a position of a mobile device.

Speech is again resumed at time T7 and may continue until time T8, after which there is a break in speech from time T8 to time T10. The minimum break in speech of one-half seconds is reached at time T9, at which time voice data transmission is disabled. GPS data processing is enabled at time T9. At time T10, the user may again speak into the microphone and continue speaking until time T12. Voice data transmission is, however, de-activated until time T11. The difference between time T11 and time T9 is for example about two seconds and is sufficiently large to process a sufficient amount of GPS data. A signal is transmitted at time T9 which enables GPS data processing and at time T11 another signal is transmitted which disables GPS reception and processing. At time T11, voice data transmission is again enabled. In this example a portion of the speakers voice information (between T10 and T11) is cutoff due to the requirement to complete the GPS processing. In other embodiments, the renewed voice activity could result in the GPS processing period to be terminated, thus allowing uninterrupted speech. However, this could result in unsuccessful completion of the GPS processing.

It should be noted that the time intervals used to process the GPS data need not be equal. For example in the above example the time intervals T5–T6 and T9–T11 need not be equal. This may be the case since information gotten from the processing of a prior interval (e.g. T5–T6), may aid in the reduction in the processing time required for a subsequent processing of GPS signals (e.g. T9–T11). For example, prior GPS processing determines times-of-arrival of the various GPS signals. These times-of-arrival may be projected forward in time to estimate the times-of-arrival of such signals at a later instant in time. Such estimates reduce the processing required to determine the precision times-of-arrival of the GPS signals, which are required for precision geolocation. It should also be noted that the periods of time during which GPS processing is performed (T5–T6 and T9–T11 in the prior example) may either be predetermined or may be adaptive in nature. A simple procedure would utilize periods which are fixed and predetermined in a manner such that successful GPS processing would be assured. A more complex procedure would be one in which the GPS processing interval would be adaptable, depending upon a variety of conditions. Once complete, voice transmission may be resumed. The conditions controlling the interval length would include received signal strength of received SPS signals and a priori information about such signals parameters, for example the range of uncertainty of the Doppler frequencies and times-of-arrival of such signals. As indicated above, prior SPS signal processing operations may result in the reduction of the required interval lengths for subsequent processing. Alternatively, as previously discussed, voice inactivity could determine the interval length.

The communication section of the mobile device may go into half duplex mode during periods when voice data transmission is disabled. It may therefore be possible to receive voice data and have an acoustic speaker, which is a part of the mobile device, create an audible signal. As shown in FIG. 4, it may therefore be possible to receive voice data during the interval beginning at T5 and ending at T6, when voice data transmission is disabled. In other embodiments both transmission and reception of voice data would be prevented during this interval.

Figure 5:
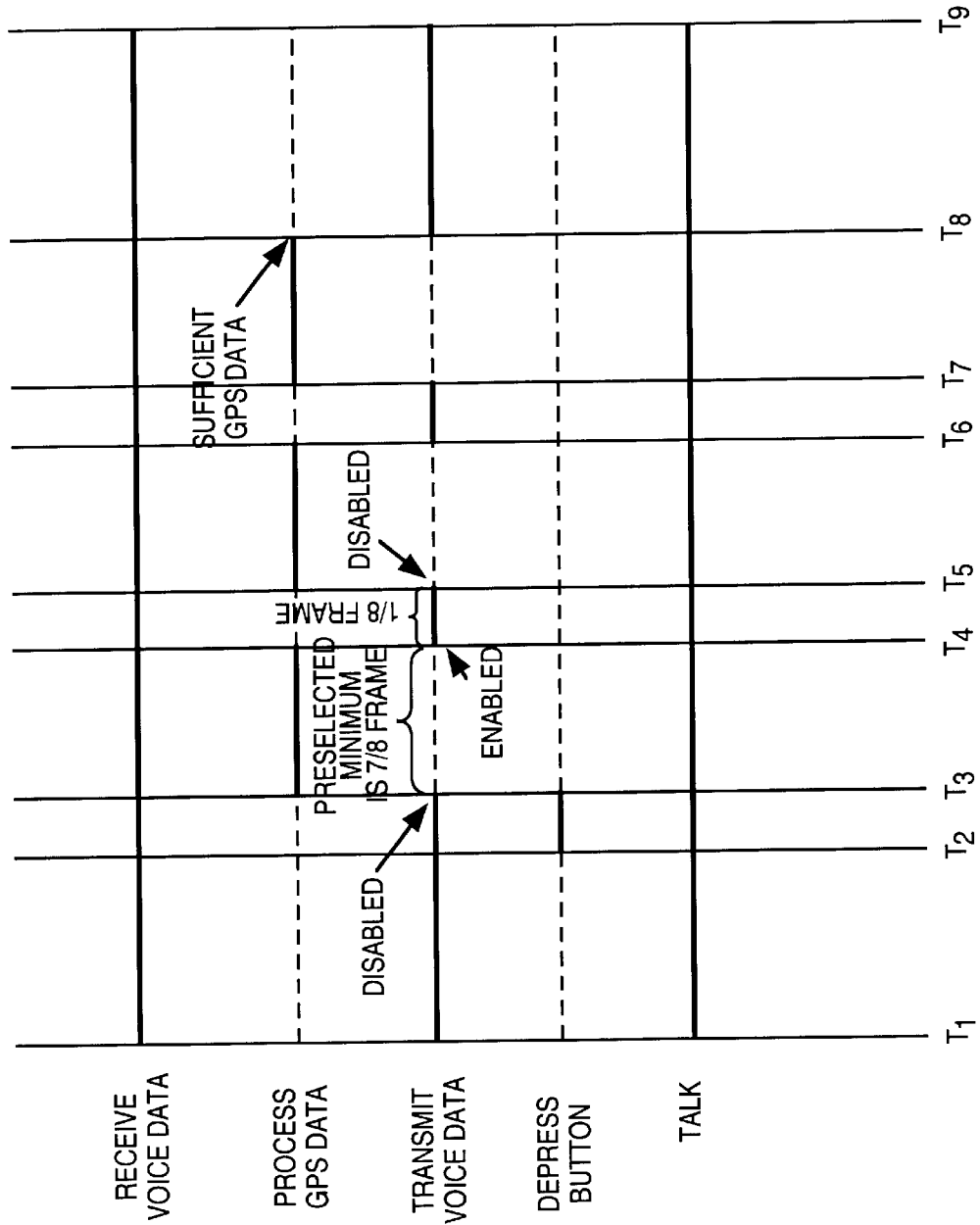
FIG. 5 is a time chart illustrating another method of operating a mobile device according to the invention.

FIG. 5 illustrates another method, according to which the mobile device may operate. The assumption is made that a person talks into a microphone continuously from time T1 to time T9. Voice data transmission is initiated at time T1 and continues through time T2.

The person depresses a button at time T2, or, in another embodiment, the person may create some other action on the mobile device. The button is depressed from time T2 and released at time T3. At time T3, upon release of the button, voice data transmission is disabled. A control signal is transmitted which enables GPS data processing.

Voice data transmission is then alternately disabled and enabled in an alternating time-based manner. Voice data is disabled for ⅞ of a frame and then enabled for ⅛ of a frame. Each time voice data transmission is disabled, a control signal is transmitted which enables GPS data processing, and each time voice data transmission is enabled, a control signal is sent which disables GPS data processing. In the example given, voice data transmission is disabled at times T3, T5, and T7 and enabled at times T4, T6, and T8. GPS data is processed from time T3 to time T4, from time T5 to time T6, and from time T7 to time T8. The amount of GPS data accumulated and processed from when the button is released at time T3 until time T8 is sufficient to triangulate the position of the mobile device. Voice data transmission is not again disabled after time T8 except if the button is again depressed. By this means the mobile device user may cause upon demand the GPS processing to commence and later end.

The mobile device may also go into half duplex mode every time voice data transmission is disabled so that voice data can be received, processed, and an audio signal be generated. The audio signal is typically sent to a speaker in the mobile device, which generates an audible sound.

Figure 6:
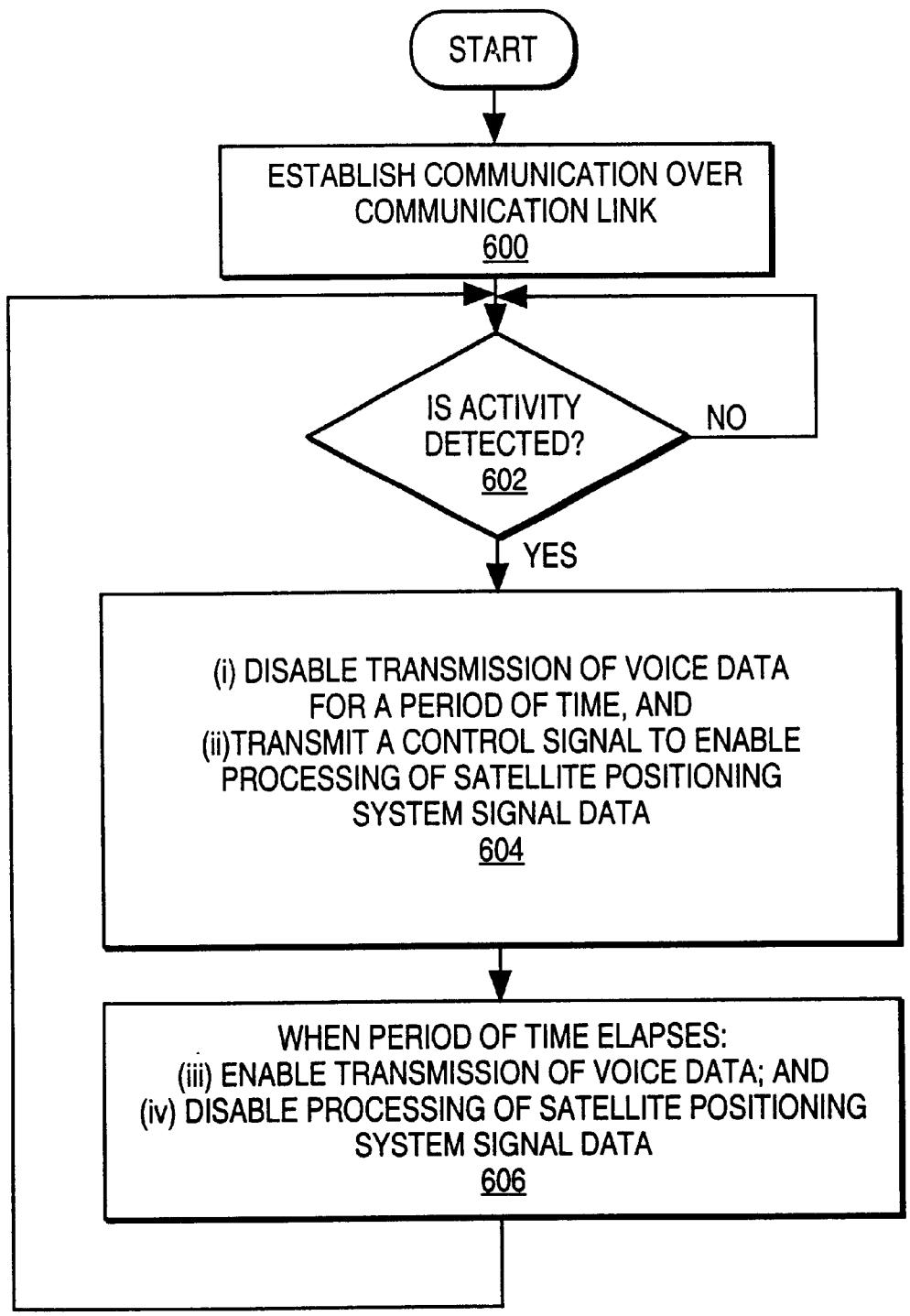
FIG. 6 is a flow chart illustrating the operations of reducing cross-interference in a mobile device according to a method of the present invention.

FIG. 6 illustrates the basic operations according to the invention. In step 600 communication is established over a communication link. In step 602 a determination is made whether an activity is dictated. An activity may for example be the absence of speech detected by a microphone of the mobile device, as described with reference to FIG. 4, or the depression of a button such as described with reference to FIG. 5. Other activities may also be possible.

Step 604 is executed if the activity is detected in step 602. In step 604 (i) voice data transmission is disabled for a period of time, and (ii) a control signal is transmitted to enable processing of satellite positioning system signal data. In FIG. 4, step 604 occurs at times T5 and T9 and in FIG. 5, step 604 occurs at time T3. When the period of time elapses, step 606 is executed. In step 606 (iii) transmission of voice data is enabled, and (iv) processing of satellite positioning system signal data is disabled. In FIG. 4, step 606 occurs at times T6 and T11 and in FIG. 5, step 606 occurs at time T4. As indicated previously the period of time of 604 may be predetermined or adaptable, depending upon the processing strategy employed.

In the mobile device 150 of FIG. 2, circuits within the GPS section and communication section were illustrated as dedicated and separated between the two sections. It is to be noted however, that embodiments of the present invention may be used in mobile devices in which one or more elements are shared between the two sections. For example, the functions of microprocessor 104 and 115 may be combined into a single processor or programmable digital circuit which may be shared between the GPS and communication sections. Likewise, one or more of the frequency converters, switches, or antenna units may be shared between the two sections.

In the preceding discussion a control signal was discussed that is sent to the GPS receiver and/or processing elements to activate or deactivate the GPS operation. The control signal was shown to have flowed over a distinct path, such as path 110, 117 and 116. It should be appreciated that in some GPS implementations both the GPS signal processing circuitry and the cellphone processing circuitry may be placed within the same integrated circuit. In this case, the gating control signal may be entirely present within the same integrated circuit and not be observable as an external physical line. Furthermore, such control signals may be sent over a common microprocessor bus that is shared by a number of circuit elements, such as memories, keyboards, etc. The current invention should be interpreted to include these forms of the control signal. In addition, as just illustrated, the cellphone, or other communication unit, may not be entirely distinct from the SPS receiver, again since they may share common circuitry, for example, RF front end components, microprocessors, etc. However, the communication function and the SPS function will have some distinct portions of hardware elements and/or software. Hence, when we refer to the "communication unit" and to the "SPS receiver" we are not restricting either to be entirely or even predominantly distinct.

Cellular Telephone/GPS Network

Figure 3:
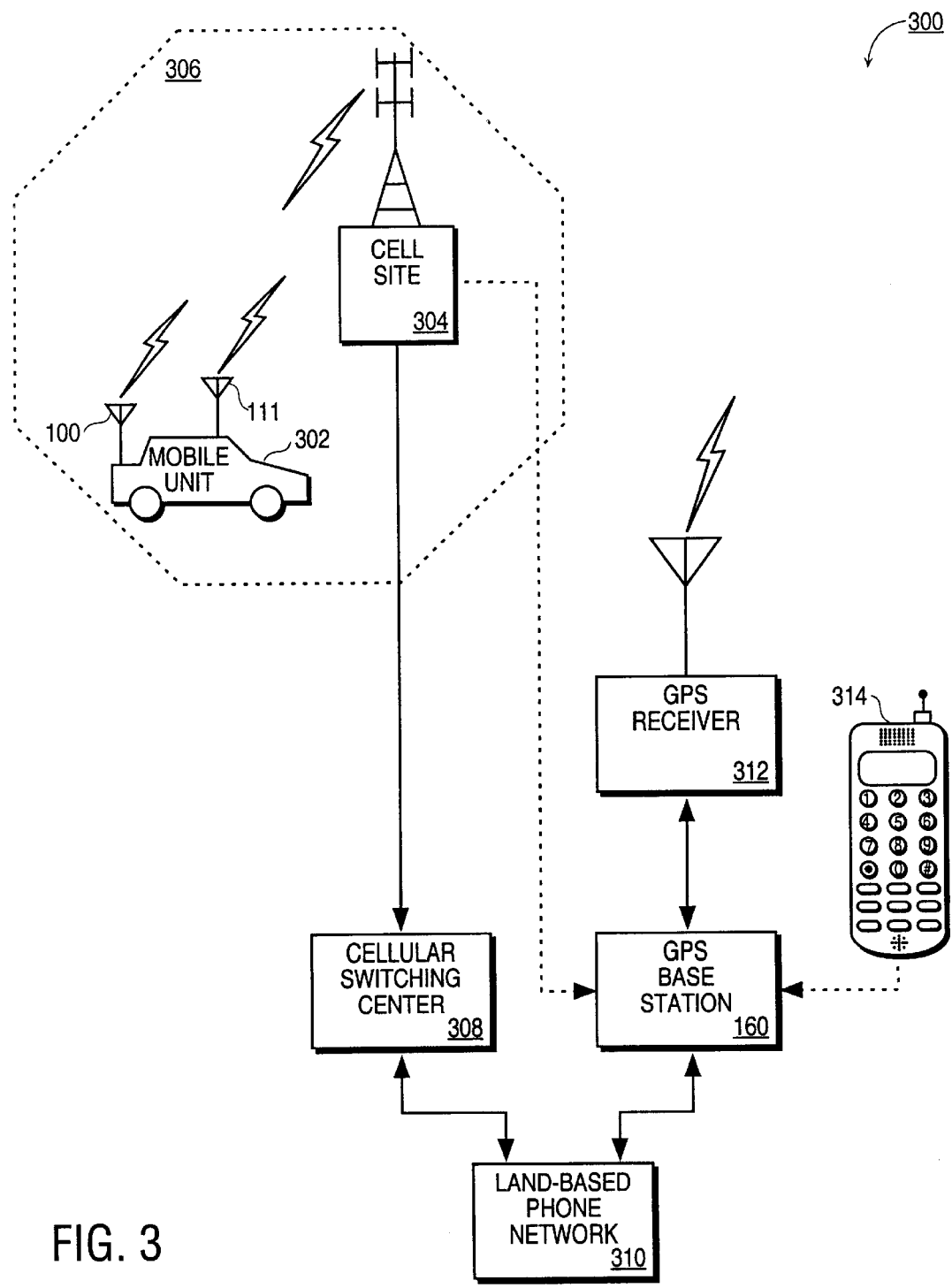
FIG. 3 illustrates a mobile device used in a cellular telephone network according to one embodiment of the present invention.

As described above, one embodiment of the present invention is used in a mobile device in which the communication transceiver is a cellular telephone used in a cellular network. FIG. 3 illustrates the use of mobile device 150 in the context of a cellular telephone network to form a combined GPS and cellular system 300. Area 306 represents a cellular telephone cell which is served by cell site 304. Cell site 304 transmits and receives cellular telephone signals to and from cellular phones and receivers, such as mobile device 302, within cell 306. Mobile device 302 contains a mobile device, such as mobile device 150 in FIG. 1. Mobile device 302 communicates cellular signals to cell site 304 through communication antenna 100, and receives GPS signals from GPS satellites through GPS antenna 111. Cell site 304 transmits cellular transmissions from mobile devices within cell 306 to a land-based phone network 310 through cellular switching center 308. Cellular switching center 308 transmits communication signals received from mobile device 302 to the appropriate destination. Cellular switching center 308 may service several other cells in addition to cell 306. If the destination of the signal transmitted by mobile device 302 is another mobile device, a connection is made to the cell site that covers the area in which the called mobile device is located. If the destination is land-based, cellular switching center 308 connects to land-based phone network 310.

It should be noted that a cellular based communication system is a communication system which has more than one transmitter, each of which serves a different geographical area, which is predefined at any instant in time. Typically, each transmitter is a wireless transmitter which serves a cell which has a geographical radius of less than 20 miles, although the area covered depends on the particular cellular system. There are numerous types of cellular communication systems, such as cellular telephones, PCS (personal communication system), SMR (specialized mobile radio), one-way and two-way pager systems, RAM, ARDIS, and wireless packet data systems. Typically the predefined different geographical areas are referred to as cells and a number of cells are grouped together into a cellular service area, and these number of cells are coupled to one or more cellular switching centers which provide connections to land based telephone systems and/or networks. Service areas are often used for billing purposes. Hence, it may be the case that cells in more than one service area are connected to one switching center. Alternatively, it is sometimes the case that cells within one service area are connected to different switching centers, especially in dense population areas. In general, a service area is defined as a collection of cells within close geographical proximity to one another. Another class of cellular systems that fits the above description is satellite based, wherein the cellular basestations are satellites that typically orbit the earth. In these systems, the cell sectors and service areas move as a function of time. Examples of such systems include the Iridium, Globalstar, Orbcomm and Odyssey systems.

In the system illustrated in FIG. 3, the GPS position information transmitted by mobile device 302 is transmitted to GPS server basestation 160 through land-based phone network 310. GPS basestation 160 serves as the processing site for computing the position of the GPS receiver in remote unit 302. GPS basestation 160 may also receive GPS information from satellite signals received in GPS receiver 312 (for example, to provide differential corrections to the mobile GPS information). GPS basestation 160 may be directly linked to cell site 304 through a land-line or radio link to receive the corresponding cellular communication signals. Alternatively, GPS basestation 160 may receive the corresponding cellular communication signals from a cellular phone 314 which transmits signals to a cellular receiver in GPS basestation 160.

It should be noted, that the cellular network system 300 of FIG. 3 represents one embodiment of the utilization of the present invention, and that other communication systems other than a cellular telephone network, may be used to transmit GPS signals from a mobile device to a GPS basestation.

Cellular Communication Systems

Embodiments of the present invention may be used in several different cellular telephone systems. The specific cellular system or standard depends upon the region in which the system is deployed since cellular standards vary among different countries and regions.

In one embodiment of the present invention, the combination mobile device 150 is used in the GSM cellular system. GSM is a Pan-European digital cellular system that utilizes Time Division Multiple Access (TDMA) methods. When transmitting voice information, the handset sends a burst of data during a timeslot equal to 15/26 milliseconds. There are eight timeslots per TDMA frame and the handset only transmits during one of these frames, in a primary mode of operation. Hence, the transmitter is activated only 12.5% of the time. Accordingly the control line for this system (i.e., gating signal 110 in FIG. 2) will indicate an active transmission 12.5% of the time. This causes the GPS receiver 130 to gate out and/or ignore the input GPS data for this period of time. The "off" periods are very short, less than one GPS code period (977.5 microseconds) and only about 1/20 the duration of a GPS data bit. The effective sensitivity loss is a factor of 0.875 or −0.58 dB.

Another embodiment of the present invention may be used in the IS-136 North American TDMA system. The IS-136 system uses six time slots per 40 millisecond frame period. For full rate signaling, a voice traffic channel occupies two such slots, or 13.33 milliseconds. For half-rate signaling, a voice traffic channel occupies one time slot or 6.66 milliseconds. Hence, for full rate signaling it may not always be practical to receive a GPS data message together with transmission gating; however, measurement of the GPS PN epochs (for determining the so-called "pseudoranges") may still be performed. The resulting sensitivity loss is 0.667 or −1.76 dB in this case. If half-rate signaling is used, the resulting sensitivity loss is reduced to 0.833 or −0.76 dB.

A further embodiment of the present invention may be used in the IS-95 North American Code Division Multiple Access (CDMA) system. In the IS-95 system, signals are prevented from interfering with one another by each using a different spread spectrum spreading code. Data is organized in 20 millisecond frames. However, when transmitting signals at low data rates (e.g., non-continuous speech), the data is transmitted in bursts that only occupy a portion of the frame. For example, at 1200 baud, the data bursts only occupy 1/8 of a frame, and during the remainder of the frame the transmitted signal is sent at reduced power levels. During these times of reduced emissions, the GPS receiver 130 can be activated. Likewise, during periods of normal transmission, the GPS receiver 130 can be deactivated, that is, the receiver front-end is switched off and/or the input GPS data is ignored by the processing circuitry. The effective sensitivity loss to the GPS receiver for the 1200 baud transmission case is equivalent to a reduction in integration time to 7/8 that is otherwise possible, which is equivalent to −0.58 dB. For this 1200 baud case, the times of transmission the data burst periods are only 1.25 milliseconds, which is a small fraction of a GPS data bit (20 milliseconds). Thus, a conventional GPS receiver can still demodulate satellite data messages in the presence of the gating signal 110.

In the foregoing, a system has been described for reducing cross-interference in a combined GPS receiver and communication transceiver unit. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than restrictive sense.

What is claimed is:

1. A method of operating a mobile device, comprising:
   detecting a first activity of the mobile device, wherein the first activity is due to an operation carried out by a user of the mobile device, wherein the operation is the absence of speech received by a microphone of the communication unit;
   upon detection of the first activity:
   (i) disabling wireless transmission of date over a wireless data link from a communication unit of the mobile device; and
   (ii) transmitting a first control signal from the communication unit to a satellite positioning system receiver of the mobile device, the first control signal enabling the start of processing of satellite positioning system signals received by the receiver for a period, the data transmission remaining disabled even when a person speaks into a microphone of the mobile device, during said period.

2. The method of claim 1 wherein the operation is the depression of a button on the mobile device.

3. The method of claim 1 wherein the wireless transmission is alternately disabled and enabled.

4. The method of claim 3 wherein disabling and enabling of data transmission is time-based.

5. The method of claim 4 wherein disabling and enabling of data transmission is periodic.

6. The method of claim 1 wherein wireless transmission is alternately disabled and enabled.

7. The method of claim 1, further comprising:
   (iii) enabling wireless transmission of data over the wireless data link from the communication unit after a sufficient amount of satellite positioning system data is received.

8. The method of claim 7, further comprising:
   (iv) transmitting a second control signal from the communication unit to the satellite positioning system receiver when wireless transmission is enabled, the second control signal disabling processing of satellite positioning system signals received by the receiver.

9. The method of claim 8 wherein (i) and (ii) are periodically alternated with (iii) and (iv).

10. The mobile device of claim 1 wherein said period is predetermined.

11. The mobile device of claim 1 wherein said period is adaptable, with the end of said period being determined during said processing satellite positioning system signals.

12. A method of operating a mobile device, comprising:
    detecting a first activity of the mobile device;
    upon detection of the first activity:
    (i) disabling wireless transmission of date over a wireless data link from a communication unit of the mobile device; and
    transmitting a first control signal from the communication unit to a satellite positioning system receiver of the mobile device, the first control signal enabling the start of processing of satellite positioning system signals received by the receiver for a period the data transmission remaining disabled even when a person speaks into a microphone of the mobile device, during said period;
    wherein wireless transmission of data is disabled due to a user of the mobile device speaking into a microphone of the communication unit.

13. A mobile device comprising:
    a satellite positioning system antenna for receiving satellite positioning system signals from a plurality of satellite positioning system satellites;
    a receiver circuit, coupled to the satellite processing system antenna, to process the satellite positioning system signals;
    a detector of an activity of the mobile device;
    a microphone to convert speech to voice data;
    a wireless transmitter operable to transmit the voice data wirelessly over a wireless date link;
    an output amplifier coupled to the wireless transmitter; and
    a communication unit circuit operable to control the output amplifier to transmit a signal wirelessly from the wireless transmitter and, when the detector detects the activity:
    (i) disable wireless transmission by the output amplifier; and
    (ii) transmit a first control signal to the receiver circuit so that the receiver circuit begins the processing of satellite positioning system signals receiver by the satellite positioning system antenna during period of time, the output amplifier remaining disabled even when a person speaks into the microphone during said period of time;
    wherein said period of time is adaptable, with the end of said period of time being determined during said processing of satellite positioning system signals.

14. The mobile device of claim 13 further comprising:
    a button that can be depressed by the user, the operation being depression of the button.

15. The mobile device of claim 13 wherein wireless transmission is alternately disabled and enabled.

16. The mobile device of claim 13 wherein said period of time is predetermined.

17. A mobile device comprising:
    a satellite positioning system antenna for receiving satellite positioning system signals from a plurality of satellite positioning system satellites;
    a receiver circuit, coupled to the satellite processing system antenna to process the satellite positioning system signals;
    a detector of an activity of the mobile device, wherein the activity is due to an operation carried out by a user of the mobile device, wherein the operation is the absence of speech received by the microphone;
    a microphone to convert speech to voice data;
    a wireless transmitter operable to transmit the voice data wirelessly over a wireless date link;
    an output amplifier cooled to the wireless transmitter; and
    a communication unit circuit operable to control the output amplifier to transmit a signal wirelessly from the wireless transmitter and, when the detector detects the activity;
    (i) disable wireless transmission by the output amplifier; and
    (ii) transmit a first control signal to the receiver circuit so that the receiver circuit begins the processing of satellite positioning system signals receiver by the satellite positioning system antenna during period of time, the output amplifier remaining disabled even when a person speaks into the microphone during said period of time.

18. A mobile device comprising:
    a satellite positioning system antenna for receiving satellite positioning system signals from a plurality of satellite positioning system satellites;

a receiver circuit, coupled to the satellite processing system antenna, to process the satellite positioning system signals;

a detector of an activity of the mobile device, wherein the activity is due to an operation carried out by a user of the mobile device;

a microphone to convert speech to voice data;

a wireless transmitter operable to transmit the voice data wirelessly over a wireless date link;

an output amplifier coupled to the wireless transmitter; and a communication unit circuit operable to control the output amplifier to transmit a signal wirelessly from the wireless transmitter and, when the detector detects the activity;

(i) disable wireless transmission by the output amplifier; and (ii) transmit a first control signal to the receiver circuit so that the receiver circuit begins the processing of satellite positioning system signals receiver by the satellite positioning system antenna during period of time, the output amplifier remaining disabled even when a person speaks into the microphone during said period of time;

wherein wireless transmission of data is disabled while a user of the mobile device speaks into a microphone of the communication unit.

* * * * *